July 25, 1950  J. F. GEORGE  2,516,622
FRUIT PICKER
Filed Aug. 23, 1946  2 Sheets-Sheet 1
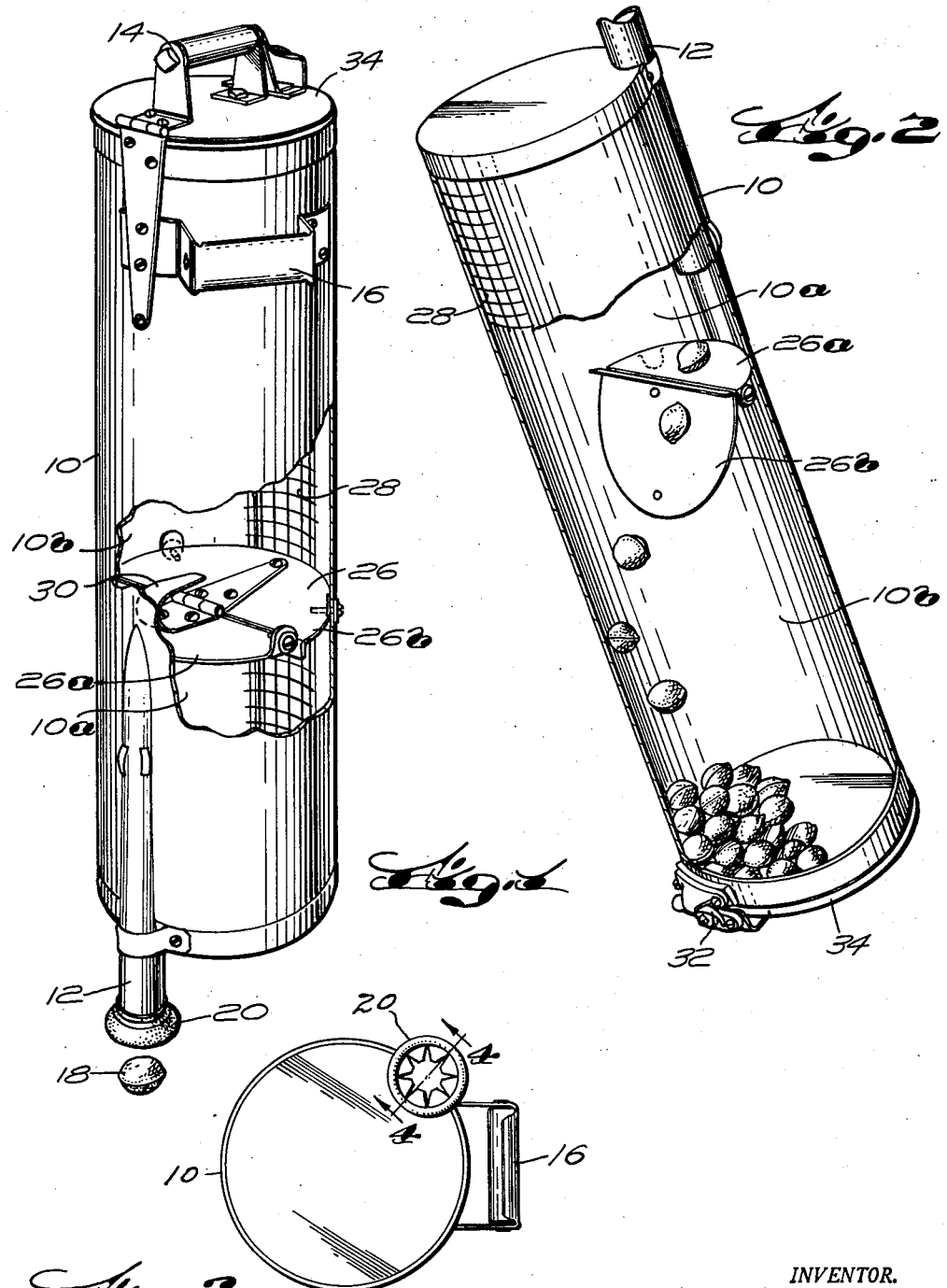
INVENTOR.
Joseph F. George
BY
Harry Dexter Peck
Attorney July 25, 1950    J. F. GEORGE    2,516,622
FRUIT PICKER Filed Aug. 23, 1946    2 Sheets-Sheet 2

INVENTOR.
Joseph F. George
BY
Harry Dexter Peck.
Attorney

Patented July 25, 1950

2,516,622

UNITED STATES PATENT OFFICE 2,516,622

FRUIT PICKER

Joseph F. George, Crows Landing, Calif.

Application August 23, 1946, Serial No. 692,641

1 Claim. (Cl. 56—328)

This invention relates to improvements in fruit pickers. It is herein disclosed as it may be applied to the gathering of nuts, but it is also adaptable to other fruit which may be picked up from the ground.

The object of my invention is to provide a picker which can be manually handled to pick up fruit individually from the ground and collect such fruit until a quantity large enough to be transferred to a larger carrier is gathered.

The best mode in which I have contemplated applying the principles of my invention is shown in the accompanying drawings but these are merely illustrative for it is intended that the patent shall cover by suitable expression in the appended claims whatever features of patentable novelty exist in the invention disclosed.

In the accompanying drawings:

Fig. 1 is a perspective of my improved picker, with part of the casing cut away, in the picking position;

Fig. 2 is another similar perspective showing the picker in position to transfer the picked fruit from one chamber of the picker to another chamber, or from the picker to another carrier;

Fig. 3 is a bottom plan view;

Figures 4, 5:
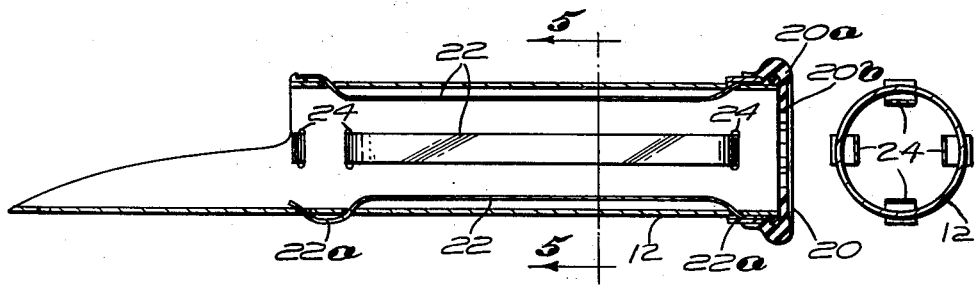
Fig. 4 is an enlarged section, as on line 4—4 of Fig. 3, showing a preferred form of picker tube.
Fig. 5 is a section as on line 5—5 of Fig. 4.

Referring to the drawings, and more particularly to Figs. 1, 2 and 3, my improved picker comprises a casing 10 for gathering or collecting the picked fruit, a picker tube 12 for picking fruit individually from the ground, and a pair of handles 14, 16 by which the picker can be handled manually.

Figure 10:
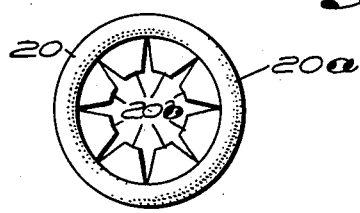
Fig. 10 is an enlarged bottom view of the preferred form of picker cap.

When in use for actually picking the fruit, the picker is held in a generally vertical position as shown in Fig. 1. The picker tube 12 is moved toward and over the fruit, such as a walnut 18, and then pressed down around the fruit. Over the end of the picker tube is a picker cap 20 (see also Figs. 4 and 10) which is made of resilient material such as rubber or the like. The rim 20a fits tightly around the lower edge of the picker tube and extending inwardly from the rim are resilient sections 20b. These may be of various shapes, those shown in Fig. 10 being satisfactory, but preferably are of such extent that they provide a central opening somewhat smaller than the fruit to be picked. As the tube is pressed down around the fruit, the resilient sections yield upwardly and somewhat outwardly to permit the fruit to pass inside the plane of the lower edge of the tube. When this occurs the resilient sections spring back to their normal flat positions, giving the fruit a slight upward thrust as they return, and thereafter holding the individual fruit just picked from dropping out of the tube.

Upon the tube being presented to another fruit in the manner just described, this piece of fruit will force the fruit previously picked upward within the tube. This upward movement of the fruit previously picked brings it within the control, as it were, of other resilient means provided inside the tube. As shown in Figs. 4 and 5 these means are several flat band springs 22 whose ends 22a are bent to engage suitably disposed slots 24 in the wall of the tube. These band springs are normally spaced apart from the inner surface of the tube so that the distance between their opposed surfaces is somewhat less than the body thickness of the fruit. As the fruit engages the bands the latter yield readily but nevertheless exert enough force on the fruit to sustain its weight as it passes upward in the picker tube upon the picking up of each additional piece of fruit. Indeed, the bands continue to support several pieces of fruit as the column grows until finally as another piece of fruit is picked up at the entrance end of the tube, a piece of fruit is forced from the tube into a lower chamber 10a of the casing.

The lower chamber is separated from a larger upper chamber 10b of the casing by a partition 26 having a fixed section 26a and a movable section 26b. The partition is just above the exit end of the picker tube, so that as the fruit is picked it will fall inward from the picker tube and be collected in the lower chamber 10a. When an appreciable number of pieces of fruit are thus collected in the lower chamber the picker as a whole is inverted in position with the side of the casing adjacent the movable section 26b held generally downward or below the remainder of the casing as indicated in Fig. 2. This side of the casing is preferably made of wire mesh 28 (if the entire cylindrical wall of the casing is not so made) so that as the movable section 26b swings into the space of the upper chamber 10b, the fruit can roll along the screen and any dirt picked up with the fruit can drop out through the openings in the screen. Thus the fruit is transferred from the smaller lower chamber 10a into the larger upper chamber 10b, after which the picker is again reversed to its normal picking position. As this takes place the movable section 26b swings back to its closed position. This is insured by a stop plate 30 which prevents the movable partition from swinging open far enough so that it could swing further open upon return of the picker to its normal picking position.

When the upper chamber is sufficiently filled (and additional fruit may also be in the lower chamber as well) the picker is up-ended as shown in Fig. 2, the cover clasp 32 is unfastened and the cover 34 is swung back to permit the fruit to be transferred to a larger carrier such as a bag, basket, box, or even the body of a vehicle.

It is to be noted that in Figs. 1 to 5, the barrel of the picker tube is plain or truly cylindrical. It has been determined that with such a plain cylindrical wall the fruit is quite apt to bind and the tube become clogged. If, however, the resilient band springs 22 are provided, no such clogging occurs and the fruit moves readily up through the picker tube into the casing.

Figures 6, 7:
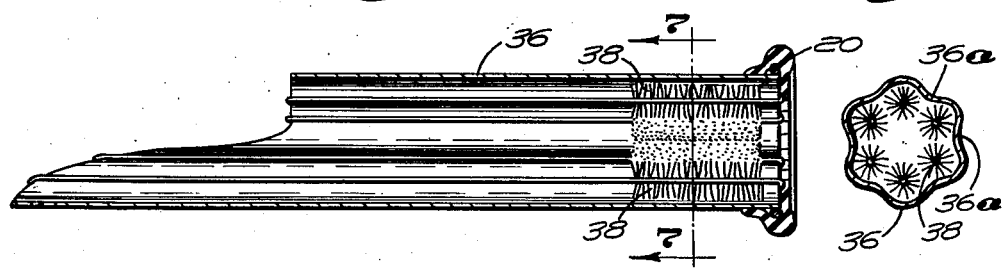
Fig. 6 is another enlarged section, similar to Fig. 4, but showing a modification.
Fig. 7 is a section as on line 7—7 of Fig. 6.

Another form of resilient means is shown in Figs. 6 and 7, and in these figures is also shown a tube 36 having longitudinal corrugations 36a along its wall. The resilient means consist of brushes 38 extending along the inside of the tube near its entrance end and being of such size as to leave a free passageway between them somewhat smaller than the body size of the fruit. As the picked fruit is forced upward in the tube the brushes prevent any clogging and offer support to the pieces of fruit, even after it has passed upward beyond the brushes. They are also effective in cleaning sand and dirt and other foreign matter from the surface of the fruit. Above the brushes, the corrugations prevent any clogging of the picker tube.

Figures 8, 9:
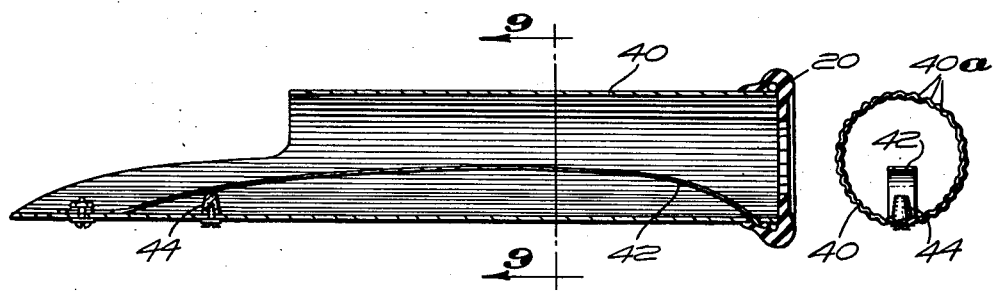
Fig. 8 is still another enlarged section, similar to Fig. 4 but showing another modification.
Fig. 9 is a section as on line 9—9 of Fig. 8.

The modification shown in Figs. 8 and 9 discloses a tube 40 having somewhat finer corrugations 40a and a single band spring 42. By fastening ends of the latter and providing a sort of fulcrum 44 this single spring is effective to hold the fruit from pressing downward and the corrugations prevent any clogging.

Although I have shown walnuts in the drawings as the fruit being picked, it is to be understood that the invention is not limited to that particular fruit or indeed to nuts generally, because by enlarging the size of the picker and employing sufficiently strong resilient means, the picker can be employed for gathering apples, oranges, or other similar fruit that is lying on the ground.

I claim:

A fruit picker comprising a picker tube which is to be pressed downward around fruit lying on the ground; a rubber cap having a flange engaging the outer wall of the receiving end of said tube and having resilient normally flat portions extending from the edge of said flange partly across the said end of said tube substantially in the plane defined by the rim of the tube to provide a central opening in the cap somewhat smaller than the fruit to be gathered; the said normally flat portions bending upwardly and somewhat outwardly to permit the fruit to enter said tube as the said receiving end is pressed downward around the fruit, then springing back to their normally flat positions to impose an upward thrust on the fruit as the springing back occurs and then holding said fruit in the tube until another fruit is subsequently gathered in the tube; and a plurality of longitudinally extending spring strips inside the tube having their ends adjacent the said receiving end secured to the wall of the tube and having their ends remote from said receiving end slidably engaged in slots in the tube wall; the said strips yieldingly engaging and holding several pieces of fruit as they are moved upwardly in the tube by the subsequently gathered fruit admitted to the tube through the said cap.

JOSEPH F. GEORGE.

REFERENCES CITED

The following references are of record in the file of this patent:

UNITED STATES PATENTS

| Number | Name | Date |
| --- | --- | --- |
| 492,824 | McLean | Mar. 7, 1893 |
| 600,256 | Cady | Mar. 8, 1898 |
| 1,298,923 | Franke | Apr. 1, 1919 |
| 1,344,205 | Holdaway et al. | June 22, 1920 |
| 1,937,828 | Macdonald | Dec. 5, 1933 |
| 2,177,041 | Loetz | Oct. 24, 1939 |
| 2,376,440 | Mansfield | May 22, 1945 |